United States Patent [19]

Kondo

[11] 3,997,032

[45] Dec. 14, 1976

[54] DISK BRAKE ASSEMBLY FOR USE IN MOTORCYCLES

[75] Inventor: Toshio Kondo, Chiryu, Japan

[73] Assignee: Aisin Seiki Kabushiki Kaisha, Japan

[22] Filed: July 1, 1975

[21] Appl. No.: 592,161

[30] Foreign Application Priority Data

July 19, 1974  Japan .................... 49-86629[U]

[52] U.S. Cl. ............................. 188/72.4; 188/73.3
[51] Int. Cl.² ......................................... F16D 55/18
[58] Field of Search ................ 188/73.3, 72.4, 26, 188/250 R, 369, 370, 72.5, 72.6, 73.5, 73.6

[56] References Cited

UNITED STATES PATENTS

| | | | |
|---|---|---|---|
| 3,480,116 | 11/1969 | Rath ................... | 188/73.3 |
| 3,500,966 | 3/1970 | Birge ................... | 188/72.4 |
| 3,773,149 | 11/1973 | Toshida et al. .......... | 188/73.3 X |
| 3,881,576 | 5/1975 | Haraikawa et al. ........ | 188/73.3 X |

FOREIGN PATENTS OR APPLICATIONS 1,378,479  12/1974  United Kingdom ............ 188/73.3

*Primary Examiner*—Trygve M. Blix
*Assistant Examiner*—Douglas C. Butler
*Attorney, Agent, or Firm*—Oblon, Fisher, Spivak, McClelland & Maier

[57] ABSTRACT

A disk brake assembly adapted for use in motorcycles comprises a stationary yoke and a movable housing, each being made preferably of aluminum alloy. The housing is provided with an elongated hole through which an arm of the stationary yoke is extended for slidably receiving a pair of screw bolts fixed to the housing. The peripheral opening of the elongated hole between the housing and the arm is closed by a rubber cover. The braking torque on one brake pad is taken by the stationary yoke while the braking torque on another brake pad is transmitted to the housing to be taken by the stationary yoke through the screw bolts.

6 Claims, 3 Drawing Figures

DISK BRAKE ASSEMBLY FOR USE IN MOTORCYCLES

BACKGROUND OF THE INVENTION

This invention relates generally to a disk brake assembly for vehicles, and more particularly to a disk brake assembly adapted for use in motorcycles.

It is necessary in the manufacture of vehicular disk brake assemblies, particularly for a disk brake assembly adapted for use in a motorcycle, to provide means for preventing admission of foreign materials, such as water, dust and mud, into the interior thereof, since the disk brake assembly of the type characterized herein is frequently exposed to the atmosphere, so that such foreign materials are likely to be admitted therein.

In addition, the disk brake assembly of the type characterized herein is required to be light in weight. Accordingly, the major part of the assembly is usually made of a light metal alloy, such as, for example, aluminum alloy. Therefore, it is necessary for the stiffness and strength of the disk brake assembly to be as great as possible in order to compensate or reinforce the light-weight assembly.

SUMMARY OF THE INVENTION

It is therefore one of the objects of this invention to provide a new and improved disk brake assembly for use in motorcycles which is designed to prevent the admission of foreign materials and yet which satisfies the light in weight requirements of such assemblies being applied to motorcycles while meeting the high strength standards thereof.

According to the present invention, the foregoing object and others as well are attained by closing an opening of an elongated hole formed in a housing, in which a stationary member for guiding the housing is extended, by a rubber-cover to thereby protect the interior of the housing from foreign materials. The elongated hole is traversed perpendicularly by screw bolt means which are slidably received by the housing-guiding stationary member, to thereby reinforce the stiffness and strength of the assembly housing. Additionally, the braking torque generated on one brake pad is received by the stationary member while the braking torque generated on the other brake pad is transmitted to the housing, so that the structure of the disk brake assembly is simple as a whole.

BRIEF DESCRIPTION OF THE DRAWINGS

Various other objects, features and attendant advantages of the present invention will be more fully appreciated as the same becomes better understood from the following detailed description when considered in connection with the accompanying drawings wherein like reference numerals designate like or corresponding parts throughout the several views, and in which.

DETAILED DESCRIPTION OF A PREFERRED EMBODIMENT

Figure 1:
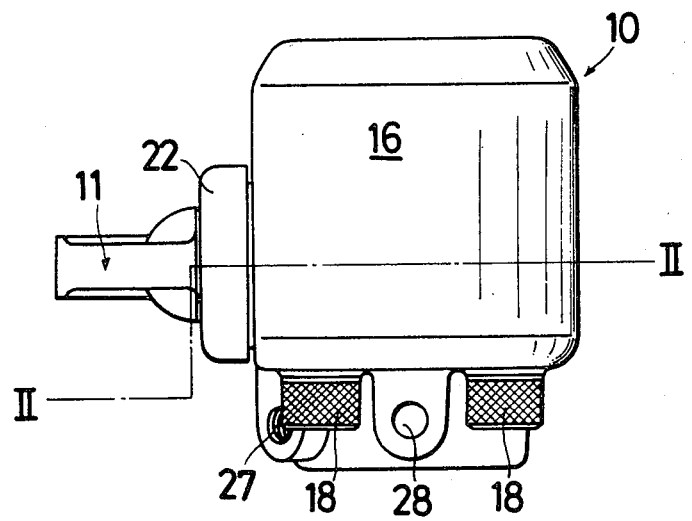
FIG. 1 is a plan view of a disk brake assembly constructed in accordance with the present invention.
Figure 2:
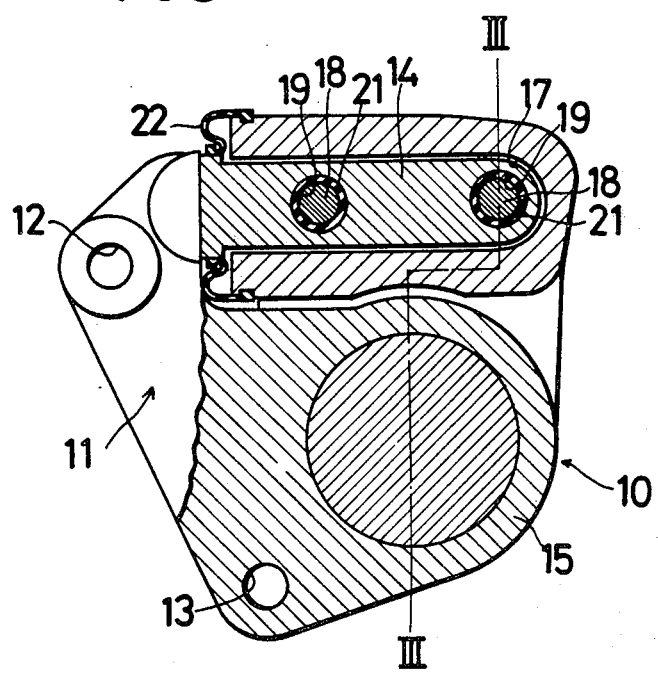
FIG. 2 is a sectional view of the disk brake assembly shown in FIG. 1 taken along the line II—II thereof.

Referring now to the drawings, especially FIGS. 1 and 2, a disk brake assembly generally designated by the reference numeral 10 comprises a yoke member 11, made of a light metal alloy, such as aluminum alloy, which is fixedly attached to a stationary portion of a motorcycle, not shown, by suitable fixing means, not shown, through holes 12 and 13. The yoke member 11 is formed generally in a C-shaped configuration, as shown in FIG. 2, and includes an integrally formed arm 14 at its upper portion and a brake torque receiving stem 15 at its lower portion. The disk brake assembly 10 further comprises a movable housing 16, made also of a light metal alloy, such as aluminum alloy, provided with an elongated opening or hole 17 within which the arm 14 of the yoke member 11 extends and is housed.

Figure 3:
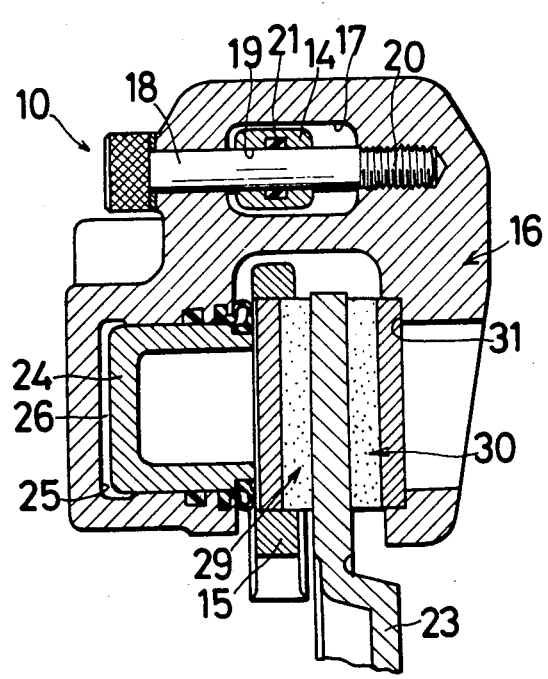
FIG. 3 is a sectional view of the assembly taken along the line III—III of FIG. 2.

A pair of fixing bolts 18, made preferably of iron alloy, are passed through a pair of corresponding apertures 19 and of the arm 14 to intersect at right angles with the arm 14. More specifically, each bolt 18 is fixed to the housing 16 at a screw-threaded end portion 20 thereof, while as shown in FIG. 3, each bolt 18 is slidably or loosely received by the arm 14 of yoke member 11. A pair of rubber ring cushions 21 are secured to the arm 14 around the apertures 19, thereby decreasing the sliding resistance of the bolts 18. A rubber cover 22 is fixed to the yoke member 11 about the arm 14 thereof at its one end periphery and to the housing 16 about the hole 17 at its other end periphery, to thereby prevent the admission of foreign materials, such as water, mud and dust, into the elongated opening or hole 17 formed in the housing.

Referring more particularly to FIG. 3, the housing 16 is formed generally in a C-shaped configuration so as to straddle a brake disk 23 rotatable in unison with the wheel of a motorcycle. A single piston 24 is slidably fitted within a bore 25 of the housing 16 to constitute a fluid chamber 26. The fluid chamber 26 is fluidically connected to a fluid inlet port 27 and an air expelling port 28, shown in FIG. 1. One brake pad 29 is mounted by the stem 15 of the yoke member 11 and is positioned between the piston 24 and the brake disk 23. The other brake pad 30 is mounted by an end portion 31 of the housing 16 and is positioned on the opposite side of the rotatable brake disk 23 from that of the first brake pad 29.

When a pressurized fluid is applied to the fluid chamber 26 via fluid inlet port 27, the piston 24 is moved thereby to the right, as viewed in FIG. 3, to press the brake pad 29 against the rotating brake disk 23, while the housing 16 is moved thereby to the left to press the brake pad 30 against the opposite side of the rotating brake disk. It is to be noted that the movement of the housing 16 is guided by the arm 14 of the yoke member 11 through the bolts 18 extending therethrough. The braking torque generated on the one brake pad 29 is received by the stem 15 of the yoke member 11 while the braking torque generated on the other brake pad 30 is received by the housing 16, and then by the yoke member 11. In other words, the housing 16 is subject to the braking torque, so that it is unnecessary to provide an additional torque receiving member. It is sufficient for the bolts 18 to receive only the braking torque on the brake pad 30 since the braking torque on the brake pad 29 is not applied to the housing 16.

The bolts 18 are prevented from being rusted due to the possible admission of foreign materials, especially due to water, because the rubber cover 22 protects the interior of the elongated opening 17 therefrom. As a result, the housing 16 may readily slide on the bolts 18 to thereby accomplish reliable brake application.

In addition, the stiffness and strength of the housing 16 is increased or reinforced in spite of the provision of the elongated hole 17 therein because the bolts 18 of iron alloy are fixed to the housing 16, passing through the elongated hole 17. Such construction of a disk brake assembly is extremely effective, especially in a motorcycle, wherein the characteristic of lightness in weight is particularly desirable.

Obviously, many modifications and variations of the present invention are possible in light of these teachings. It is therefore to be understood that within the scope of the appended claims, the invention may be practiced otherwise than as specifically disclosed herein.

What is claimed as new and intended to be covered by U.S. letters patent is:

1. A disk brake assembly associated with a rotatable brake disk of a motorcycle, comprising in combination:
   a stationary yoke member fixedly mounted on the motorcycle and including an arm and a stem;
   a housing straddling said brake disk of said motorcycle and provided with an elongated hole therein in which said arm of said stationary yoke extends;
   bolt means secured to said housing and traversing said elongated hole at substantially right angles thereto, said bolt means being slidably received by said arm of said yoke member;
   a piston slidably fitted within said housing;
   one brake pad mounted on said stem of said yoke member and being disposed between said piston and said rotatable brake disk;
   another brake pad mounted on said housing and being disposed opposite of said one brake pad relative to said rotatable brake disk; and
   a rubber cover secured to said yoke and said housing for closing the opening of said elongated hole between the housing and the arm therewithin to prevent foreign matter from entering therein;
   whereby braking torque generated on said one brake pad is received by said stem while braking torque generated on said other brake pad is received by said yoke member through said housing and said bolt means.

2. A disk brake assembly according to claim 1, wherein said bolt means comprises a pair of bolts disposed in parallel relation.

3. A disk brake assembly according to claim 2, wherein each of said bolts is threadably secured to said housing.

4. A disk brake assembly according to claim 3, wherein said arm of said yoke member includes a pair of apertures through which said bolts are passed to be slidably guided thereby.

5. A disk brake assembly according to claim 4, wherein a rubber-made ring cushion is securely mounted in each of said apertures around each bolt, thereby decreasing the sliding resistance of each bolt upon brake application.

6. A disk brake assembly according to claim 1, wherein said yoke member and said housing are made of a light metal alloy and said bolt means is made of iron alloy.

* * * * *